J. B. SCHUMAN.
SHREDDER FEEDER.
APPLICATION FILED FEB. 11, 1907.
No. 902,334.
Patented Oct. 27, 1908.
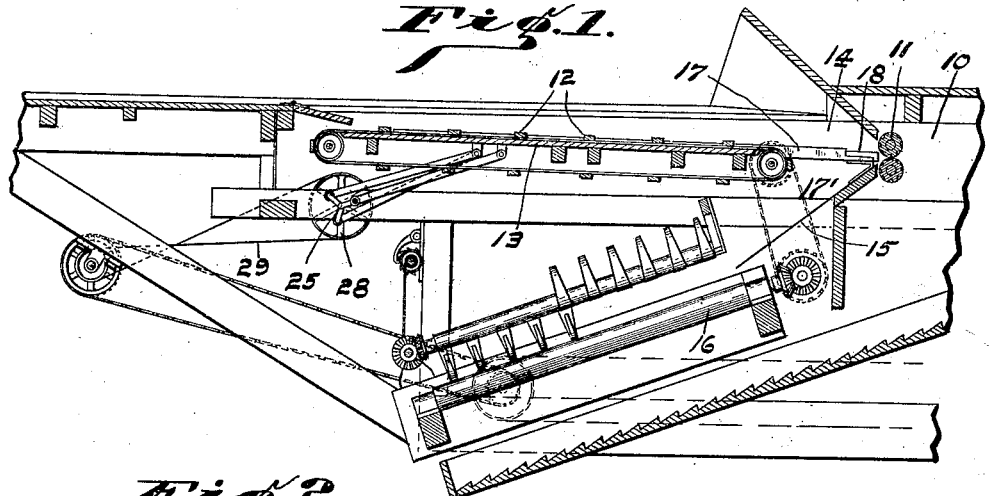
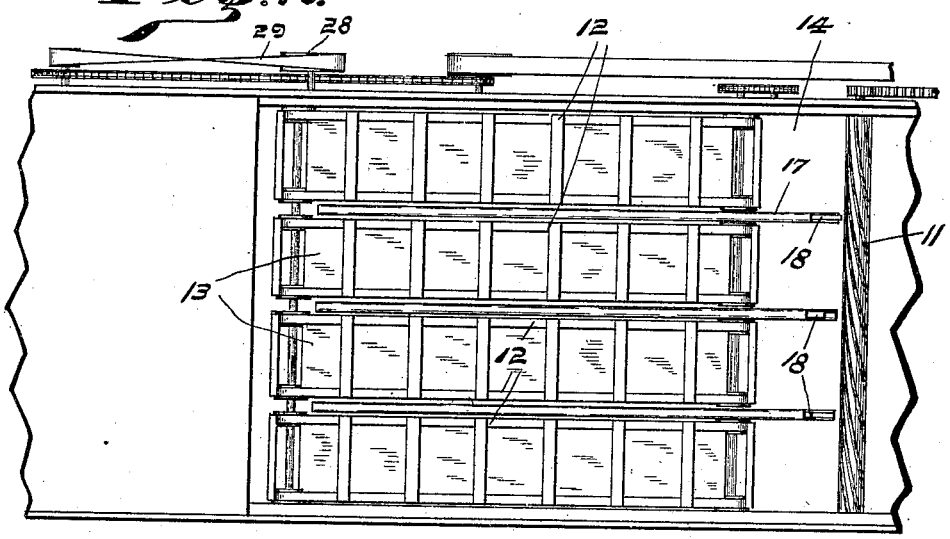
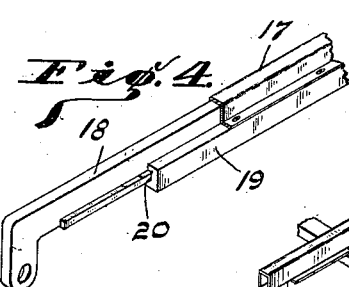
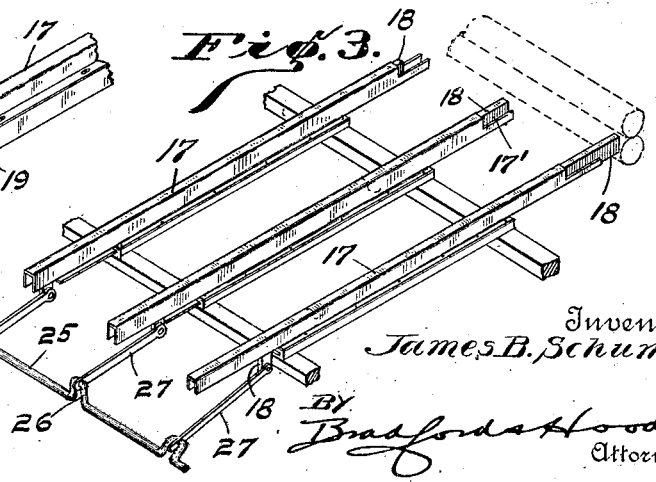

UNITED STATES PATENT OFFICE.

JAMES B. SCHUMAN, OF INDIANAPOLIS, INDIANA, ASSIGNOR TO SAID JAMES B. SCHUMAN, JOSEPH K. SHARPE, JR., AND THEOPHILUS KING, OF INDIANAPOLIS, INDIANA, A COPARTNERSHIP.

SHREDDER-FEEDER.

No. 902,334.

Specification of Letters Patent.

Patented Oct. 27, 1908.

Application filed February 11, 1907. Serial No. 356,889.

*To all whom it may concern:*

Be it known that I, JAMES B. SCHUMAN, a citizen of the United States, residing at Indianapolis, in the county of Marion and State of Indiana, have invented certain new and useful Improvements in Shredder-Feeders, of which the following is a specification.

In the operation of shredders and other similar stalk crop treating machines, difficulty is experienced in that the stalks become clogged on the feed table immediately in front of the snapping rolls, and it is the object of my present invention to provide means for preventing this clogging by so presenting the stalks to the snapping rolls that they will necessarily be caught by and carried through between the snapping rolls.

The accompanying drawings illustrate my invention.

Figure 1 is a central vertical section of a common shredder equipped with my improvement; Fig. 2 a plan thereof; Fig. 3 a perspective detail of my additional feeding means, and Fig. 4 a perspective detail of said feeding means.

In the drawings 10 indicates the main frame, 11 11 the snapping rolls, and 12 12 the usual endless feed belts of the feeder said feed belts being preferably slightly separated longitudinally and passing over stationary platforms 13, and discharging at a point adjacent the throat of the snapping rolls 11. There is a considerable gap or throat 14 between the inner end of the feed belts and the snapping rolls in order that the ears of corn may drop down from the snapping rolls onto an apron 15 which delivers said ears to the husking mechanism 16.

In the ordinary feeding of the shredder of this type the stalks are laid lengthwise upon the carriers 13 butt-end foremost so that their butt-ends will be caught between the snapping rolls 11 and drawn through between said rolls, the ears being snapped off and passing downward through the throat 14. Many times the stalks become twisted and turned on the carriers 12 and, in order that such stalks may not drop through the throat 14 it has been heretofore customary to bridge the throat 14 by means of separated fingers, said fingers generally extending only from the inner end of the endless carrier to a point closely adjacent the throat of the snapping rolls. In my present form I deem it advisable to bridge the throat 14 by means of fingers 17 which however I prefer to carry back between the adjacent edges of the feed belts 12 in order to form a housing for a reciprocating plunger 18. The finger 17 may be conveniently formed of sheet metal so as to form a housing for the plunger 18, as clearly shown in Figs. 3 and 4, said fingers being attached to a guide 19 provided with a suitable track 20 in which the plunger 18 fits so as to slide easily longitudinally.

The forward ends of the fingers 17 are preferably reduced in vertical dimension as at 17' so that the forward ends of the plungers 18 will project therefrom and readily engage the stalks as they pass along the fingers 17 to the snapping rolls. I provide a plurality of fingers 17 and plungers 18, the number depending upon the width of the machine and I deem it advisable to operate them successively instead of simultaneously in order to distribute the load. For this purpose I provide a crank shaft 25 journaled in suitable bearings in the main frame 10 and provided with a multiplicity of cranks 26 each of which is connected by suitable pitman 27 with one of the plungers 18. Shaft 25 may be rotated in any suitable manner, as by means of pulley 28 and belt 29 from a moving part of the shredder.

In operation the stalks are thrown upon the feed belts 12 and moved forward thereby to the snapping rolls. If the snapping rolls fail to catch any of the stalks said stalks will become twisted upon the table and will drop in front of the rapidly reciprocating plungers 18 and said plungers will serve to positively crowd the stalks into the throat between the snapping rollers so that said rollers cannot fail to pinch the stalks and carry them forward.

I claim as my invention:

1. In a shredder, the combination, with the snapping rolls, of a plurality of endless carriers arranged side by side, a plurality of reciprocating plungers arranged between said carriers and bridging the space between the inner end of said carriers and the throat of the snapping rolls, housings arranged over said plungers and extending forward to bridge the space between the carriers and the snapping rolls, and means for reciprocating said plungers.

2. In a shredder, the combination, with the snapping rolls thereof, of a feeder adapted to carry material toward said snapping rolls, a throat being left between said feeding means and the snapping-roll-throat, reciprocating plungers arranged in said first mentioned throat, means for reciprocating said plungers toward and from the snapping-roll-throat, and fingers bridging the said first-mentioned throat and having their inner ends lower than the path of movement of the plungers.

In witness whereof, I have hereunto set my hand and seal at Indianapolis, Indiana, this 9th day of February, A. D. one thousand nine hundred and seven.

JAMES B. SCHUMAN. [L. S.]

Witnesses:
    ARTHUR M. HOOD,
    THOMAS W. MCMEANS.